United States Patent
Ju et al.

(10) Patent No.: US 8,552,692 B2
(45) Date of Patent: Oct. 8, 2013

(54) CHARGER AND DISCHARGER FOR SECONDARY BATTERY

(75) Inventors: Ria Ju, Yongin-si (KR); Young-Hak Pyo, Yongin-si (KR); Sergey Vasichev, Yongin-si (KR); Seung-Hyuck Paek, Yongin-si (KR); Sang-Chul Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 361 days.

(21) Appl. No.: 13/078,254

(22) Filed: Apr. 1, 2011

(65) Prior Publication Data

US 2012/0043939 A1    Feb. 23, 2012

(30) Foreign Application Priority Data

Aug. 19, 2010   (KR) .................. 10-2010-0080292

(51) Int. Cl.
*H02J 7/04* (2006.01)
*H02J 7/00* (2006.01)
*H02J 7/06* (2006.01)
*H02M 5/42* (2006.01)
*G05F 1/00* (2006.01)
*H02J 1/10* (2006.01)
*H02J 1/00* (2006.01)

(52) U.S. Cl.
USPC ........... 320/141; 320/129; 320/163; 320/139; 320/135; 320/140; 363/89; 323/282; 307/58; 307/66; 307/82

(58) Field of Classification Search
USPC ................. 320/129, 141, 163, 139, 140, 135; 307/58, 66, 82; 363/89; 323/282
See application file for complete search history.

(56) References Cited

U.S. PATENT DOCUMENTS

| 5,323,100 | A  | * | 6/1994  | Iketani ........................... 320/135 |
| 5,691,631 | A  | * | 11/1997 | Shimamori et al. .......... 323/272 |
| 7,038,430 | B2 | * | 5/2006  | Itabashi et al. ................ 323/224 |
| 7,301,317 | B1 | * | 11/2007 | Mattingly ..................... 323/282 |
| 7,411,316 | B2 | * | 8/2008  | Pai .................................. 307/81 |
| 7,663,345 | B2 | * | 2/2010  | Ozawa et al. ................. 320/140 |
| 7,880,440 | B2 | * | 2/2011  | Takahashi et al. ............ 320/139 |
| 7,933,694 | B2 | * | 4/2011  | Kato ............................... 701/22 |
| 2003/0151933 | A1 |  | 8/2003  | Haraguchi et al. |

(Continued)

FOREIGN PATENT DOCUMENTS

| KR | 100821323 | 4/2008 |
| KR | 100888412 | 3/2009 |
| KR | 100895252 | 4/2009 |

*Primary Examiner* — M'Baye Diao
(74) *Attorney, Agent, or Firm* — Robert E. Bushnell, Esq.

(57) ABSTRACT

A charger and discharger for a secondary battery includes a secondary battery coupled to an output stage of the charger and discharger, a first converter circuit including a first pulse voltage generator that outputs a first pulse voltage according to a first duty ratio, and a first inductor that outputs a first current in proportion to a value of an integral of the outputted first pulse voltage with respect to time to a positive electrode terminal of the secondary battery, a second converter circuit including a second pulse voltage generator that outputs a second pulse voltage according to a second duty ratio, and a second inductor that outputs a second current in proportion to a value of an integral of the outputted second pulse voltage with respect to time to a negative electrode terminal of the secondary battery, and first and second controllers controlling the duty ratios of the first and second pulse voltage generators, respectively.

13 Claims, 3 Drawing Sheets

(56) References Cited

U.S. PATENT DOCUMENTS

| | | |
|---|---|---|
| 2006/0158168 A1* | 7/2006 | Yoshida et al. ............... 323/282 |
| 2007/0058404 A1 | 3/2007 | Yaguchi |
| 2007/0229036 A1 | 10/2007 | Ozawa et al. |
| 2007/0247877 A1 | 10/2007 | Kwon et al. |
| 2008/0068869 A1 | 3/2008 | Shimizu |
| 2009/0033299 A1* | 2/2009 | Ishino ........................... 323/282 |
| 2009/0108677 A1 | 4/2009 | Walter et al. |
| 2010/0221626 A1 | 9/2010 | Horiguchi et al. |

\* cited by examiner

CHARGER AND DISCHARGER FOR SECONDARY BATTERY

CLAIM OF PRIORITY

This application makes reference to, incorporates into this specification the entire contents of, and claims all benefits accruing under 35 U.S.C. §119 from an application earlier filed in the Korean Intellectual Property Office filed on Aug. 19, 2010 and there duly assigned Serial No. 10-2010-0080292.

BACKGROUND OF THE INVENTION

1. Field of the Invention

An aspect of the present invention relates to a charger and discharger for a secondary battery, and more particularly, to a bidirectional DC/DC converter type charger and discharger for a secondary battery, in which the range of voltage is extended so that charging and discharging of the secondary battery can be performed by a single device.

2. Description of the Related Art

In general, a bidirectional power converter circuit converts a high voltage into a low voltage in a buck mode, and converts a low voltage into a high voltage by using a back electromotive force in a boost mode. In this instance, it is effective to control the conversion in a pulse width modulation (hereinafter, referred to as a 'PWM') method by using one or more metal oxide semiconductor field-effect transistors (MOSFETs). The amplitude of a voltage outputted from the bidirectional power converter circuit is determined with a PWM duty ratio.

SUMMARY OF THE INVENTION

One aspect of the present invention provides an improved charger and discharger for a secondary battery.

Another aspect of the present invention provides a bidirectional DC/DC converter type charger and discharger in which an overcharge test is performed in a device for estimating the life span and quality of a battery, thereby checking the safety of the battery.

Still another aspect of the present invention provides a bidirectional DC/DC converter type charger and discharger in which the range of the voltage applied across the battery can be extended to a range of a maximum negative voltage without adding an additional input power source in a boost mode of a general switching type DC/DC converter.

According to an aspect of the present invention, there is provided a charger and discharger for a secondary battery. The charger and discharger includes a secondary battery, first and second converter circuits, and first and second controllers.

The secondary battery is coupled to an output stage of the charger and discharger.

The first converter circuit includes a first pulse voltage generator and a first inductor. The first pulse voltage generator outputs a first pulse voltage according to a first duty ratio, and the first inductor outputs a first electric current in proportion to a value of an integral of the outputted first pulse voltage with respect to time to a positive electrode terminal of the secondary battery.

The second converter circuit is provided with a second pulse voltage generator and a second inductor. The second pulse voltage generator outputs a second pulse voltage according to a second duty ratio, and the second inductor outputs a second electric current in proportion to a value of an integral of the outputted pulse voltage with respect to time to a negative electrode terminal of the secondary battery.

The first controller controls the first duty ratio of the first pulse voltage generator. The second controller controls the second duty ratio of the second pulse voltage generator.

In a charge mode, the first controller may control the first duty ratio of the first pulse voltage generator to be a value greater than 0.5, and the second controller may control the second pulse voltage generator to be in an off-state.

Alternatively, in the charge mode, the first controller may control the first duty ratio of the first pulse voltage generator to be a value greater than 0.5, and the second controller may control the second duty ratio of the second pulse voltage generator to be zero.

In a discharge mode, the first controller may control the first duty ratio of the first pulse voltage generator to be a value smaller than 0.5, and the second controller may control the second pulse voltage generator to be in an off-state. When the voltage applied between both of the terminals of the secondary battery reaches a minimum output voltage by the single first converter circuit, the first controller may control the first duty ratio of the first pulse voltage generator to be zero, and the second controller may control the duty ratio of the second pulse voltage generator to exceed 0.5.

Alternatively, in the discharge mode, the first controller may control the first duty ratio of the first pulse voltage generator to be a value smaller than 0.5, and the second controller may control the second duty ratio of the second pulse voltage generator to be zero. When the voltage applied between both of the terminals of the secondary battery reaches a minimum output voltage by the single first converter circuit, the first controller may control the first duty ratio of the first pulse voltage generator to be zero, and the second controller may control the second duty ratio of the second pulse voltage generator to exceed 0.5.

Each one of the first and second pulse voltage generators may include a pair of metal oxide semiconductor field-effect transistors (MOSFETs) that periodically output high voltage and low voltage according to the corresponding duty ratio controlled by the corresponding first or second controller. The MOSFET may be an N-channel enhancement MOSFET.

The charger and discharger may further include first and second low-pass filters. The first low-pass filter is provided between the first inductor and the positive electrode terminal of the secondary battery. The second low-pass filter is provided between the second inductor and the negative electrode terminal of the secondary battery. The first and second low-pass filters may be primary low-pass filters.

As described above, according to the embodiments of the present invention, the charger and discharger is operated as a power converter that increases voltage while maintaining static current in the range of an input voltage, extended to a range of the maximum negative voltage in a discharge mode, thereby extending the design range of the circuit.

Also, the life span and safety of a battery can be performed without a separate estimating device.

Accordingly, it is possible to solve the delay of test time due to the detachment and movement of a large-capacity batter and a problem due to the breakdown of the battery. Also, the charging and discharging operation of a secondary battery, including an overcharge test, can be performed in the single device, thereby ensuring the reliability of data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
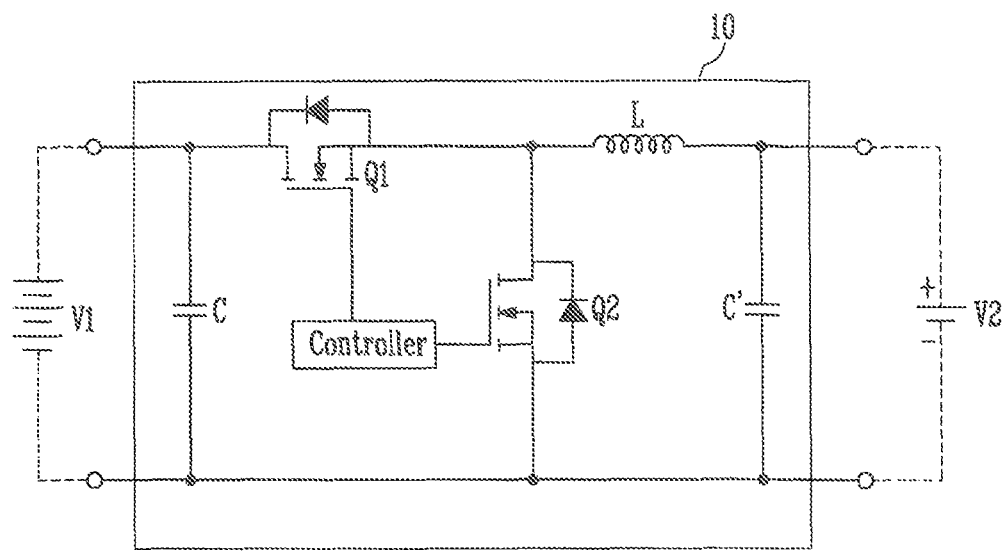
FIG. 1 is a circuit diagram showing a charger and discharger for a secondary battery using a bidirectional DC/DC converter constructed as a comparative example.

In a system of a charger and discharger for a battery, a device for testing the long life span of the battery is called as a cycler. The cycler tests a battery for a long period of time, ranging from a few days to a few months, in an environment such as a rapid charging/discharging transition condition. As a result, the response and durability of the corresponding battery are estimated.

In an overcharge test of a conventional charger and discharger, a commercial power source for generating a negative voltage is necessarily added to perform a test up to a voltage range that approaches 0V. It is substantially difficult, however, to realize an exact voltage level of 0V due to a reference voltage of the circuit, and the like. Particularly, in the case of a bidirectional switching type, because the voltage is low, it is difficult to boost the voltage in the boost mode. Hence, the range of input voltage is the most serious problem.

For such a reason, in a general charger and discharger for life span estimation, an overcharge safety test has been performed so far through a separate device or virtual experiment.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Figure 2:
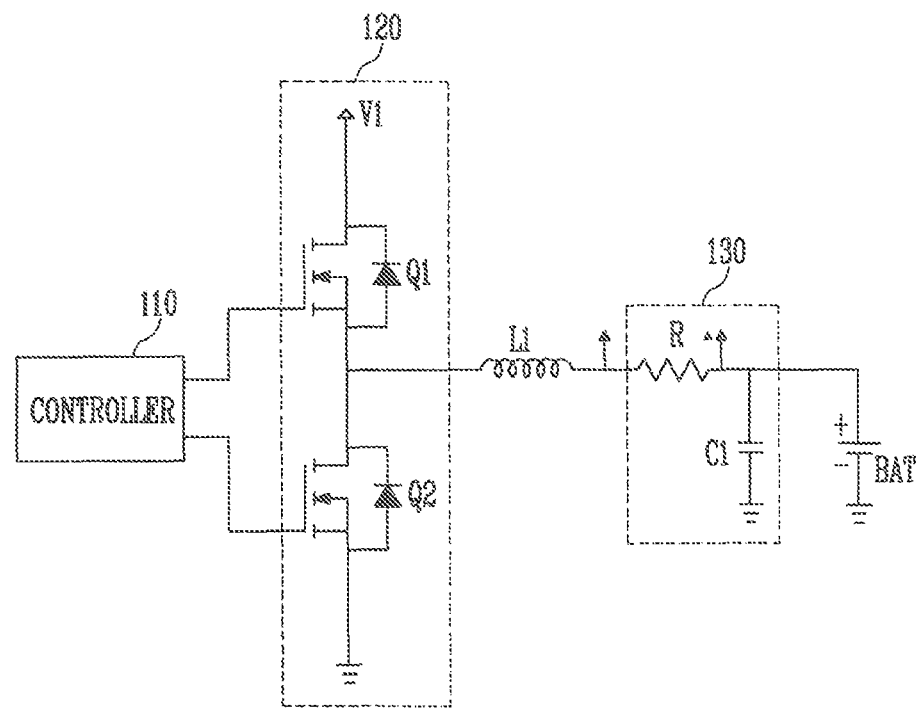
FIG. 2 is a circuit diagram showing an equivalent circuit of the charger and discharger of FIG. 1.

A bidirectional DC/DC converter type charger and discharger of a secondary battery constructed as a comparative example will be described with reference to FIGS. 1 and 2. FIG. 1 is a circuit diagram showing the charger and discharger constructed as the comparative example. FIG. 2 is a circuit diagram briefly showing the charger and discharger of FIG. 1.

This comparative example has the configuration of an input voltage V1 applied to a converter circuit 10 which outputs an output voltage V2. Charging and discharging are performed by coupling a secondary battery to an output stage to which output voltage V2 is outputted. Hereinafter, output voltage V2 will be described using the term "output stage of secondary battery" if necessary.

Meanwhile, converter circuit 10 is operated in buck and boost modes. In the buck mode, converter circuit 10 steps down input voltage V1 using a back electromotive force so as to perform an operation of charging secondary battery V2. In the boost mode, converter circuit 10 steps up input voltage V1 so as to perform an operation of discharging secondary battery V2. This will be described in detail with reference to FIG. 2.

As shown in FIG. 2, a converter circuit includes a controller 110, a pulse voltage generator 120, an inductor L1 and a low-pass circuit 130. Hereinafter, the converter circuit is used as a meaning including a pulse voltage generator, an inductor and a low-pass filter, which are operated by a single controller.

Pulse voltage generator 120 is a circuit that converts an input power by a pulse width modulation (PWM) method under the control of controller 110 and outputs the converted power. The PWM method controls a high-level signal (On) and a low-level signal (Off) to be regularly switched in a period. In this instance, an average output voltage or current is controlled by controlling a time ratio of a high-level signal with respect to a period, i.e., a duty ratio. In a power supply, output voltage is generally controlled using the duty ratio.

A square wave is generated from pulse voltage generator 120 and is provided to inductor L1 in low-pass circuit 130. Meanwhile, the amplitude of the current in inductor L1 is given as the value of the integral of voltage with respect to time. Therefore, the current in inductor L1 has a triangular wave shape in which the current is primarily functionally increased when the voltage of pulse voltage generator 120 is in a high-voltage state, i.e., in an on-state, and is primarily functionally decreased when the voltage of pulse voltage generator 120 is in a low-voltage state, i.e., in an off-state. Meanwhile, inductor L1 functions to generate a back electromotive force when step-down conversion is performed in the buck mode. Also, inductor L1 functions to remove a current component while reducing loss together with low-pass circuit 130 which will be described later.

In this comparative example, low-pass circuit 130 is implemented as a primary low-pass filter. In this instance, a capacitor C1 is coupled in parallel to a secondary battery BAT. Low-pass circuit 130 functions to remove a current component from an output voltage.

Figure 3:
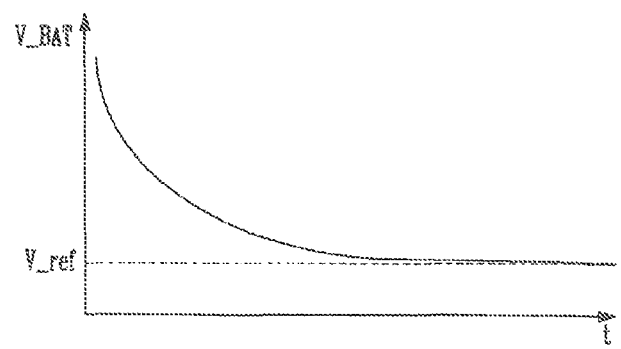
FIG. 3 is a graph showing a voltage characteristic at an output stage of the charger and discharger of FIG. 1.

A voltage characteristic at the output stage of the charger and discharger for a secondary battery constructed as this comparative example will be described with reference to FIG. 3. FIG. 3 illustrates a voltage applied between terminals of the secondary battery in the discharge stage (i.e., output stage) of the charger and discharger according to this comparative example.

As described above, the average voltage according to the duty ratio is outputted to a positive electrode terminal of the secondary battery by the operation of pulse voltage generator 120. Hence, according to single pulse voltage generator 120 of this comparative example, the voltage at the output stage coupled to the secondary battery cannot be indefinitely decreased, and is converged to a constant voltage V_ref. Therefore, such a configuration is disadvantageous for an overcharge test. That is, a separate configuration is necessarily provided so as to drop the voltage applied to the secondary battery coupled to the output stage below the minimum output voltage V_ref which is outputted from single converter circuit 10. Hereinafter, an embodiment including such a configuration will be described.

Figure 4:
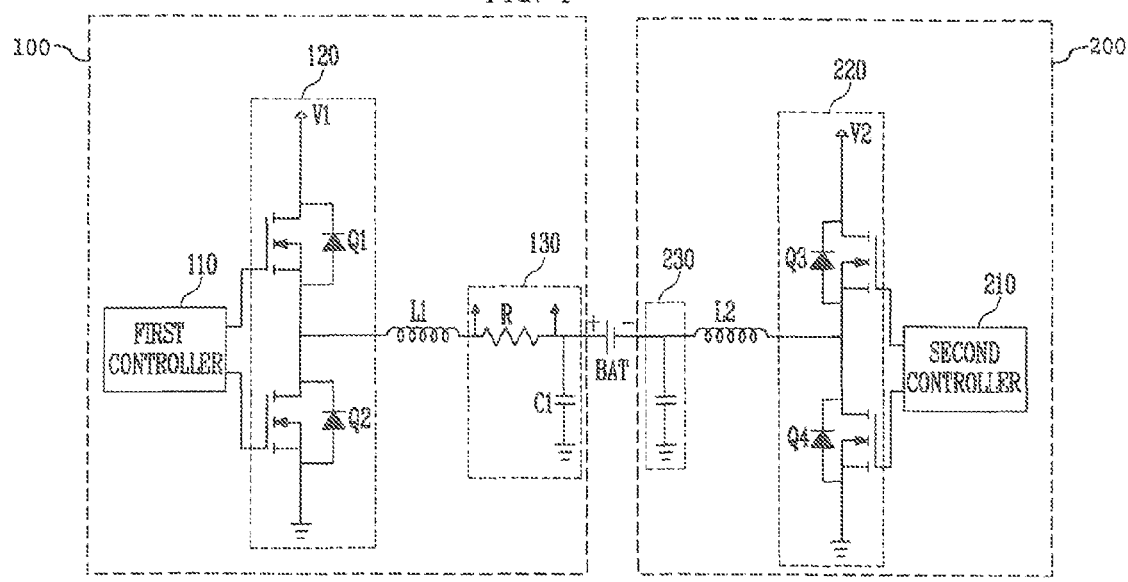
FIG. 4 is a circuit diagram showing a charger and discharger for a secondary battery constructed as an embodiment according to the principles of the present invention.

A charger and discharger for a secondary battery constructed as an embodiment according to the principles of the present invention will be described with reference to FIG. 4. FIG. 4 is a circuit diagram showing the charger and discharger constructed as this embodiment according to the principles of the present invention.

The charger and discharger constructed as this embodiment includes a secondary battery, a first converter circuit 100, and a second converter circuit 200.

The secondary battery is coupled to an output stage of first converter circuit 100, and an output stage of second converter circuit 200. In this connection state, a charging and discharging operation of the secondary battery is performed.

First converter circuit 100 includes a first pulse voltage generator 120, a first inductor L1, a first low-pass filter 130 and a first controller 110, as described above.

In this embodiment, first pulse voltage generator 120 functions to output an input voltage V1 having an average voltage according to a first duty ratio, as described above. First pulse voltage generator 120 has a pair of metal oxide semiconductor field-effect transistors (MOSFETs) Q1 and Q2. In this instance, MOSFETs Q1 and Q2 may be implemented as N-channel enhancement MOSFETs. The N-channel enhancement MOSFET limits drain current to zero under the control of a controller.

First controller 110 functions to control the duty ratio of first pulse voltage generator 120. That is, first controller 110 may control the charger and discharger according to this embodiment to be operated in a charge mode by increasing a signal ratio of MOSFET Q1 with respect to a period (the duty ratio). On the contrary, first controller 110 may control the charger and discharger according to this embodiment to be operated in a discharge mode by decreasing the signal ratio of MOSFET Q1 with respect to a period Meanwhile, that the duty ratio is zero means that first controller 110 turns off MOSFET Q1 and maintains MOSFET Q2 in an on-state. That first controller 110 turns off first pulse voltage generator 120, or first controller controls first pulse voltage generator 120 to be in an off-state, means that first controller 110 allows first pulse voltage generator 120 itself to be open-circuited by maintaining both of MOSFETs Q1 and Q2 in an off-state. In this instance, first controller 110 controls the N-channel MOSFETs so that current does not substantially flow through both of MOSFETs Q1 and Q2, thereby obtaining an effect that first pulse voltage generator 120 is open-circuited.

First inductor L1 functions to receive voltage outputted in the PWM method to output an integral current. That is, as described above, the inductor outputs a current corresponding to a value obtained by integrating the variation of voltage with respect to time. Consequently, the current in the inductor cannot be rapidly changed, and has a continuous value. First inductor L1 outputs such current to a positive electrode terminal of secondary battery BAT.

First low-pass filter 130 functions to remove a current component from the current outputted from first inductor L1 and to output the current having the current component removed therefrom to the positive electrode terminal of secondary battery BAT. As described above, first low-pass filter 130 can remove the current component while reducing power loss together with first inductor L1. First low-pass filter 130 includes a resistor R coupled in series with secondary battery BAT and a capacitor C1 connected in parallel with secondary battery BAT. That is, first low-pass filter 130 may be implemented as a primary low-pass filter in consideration of power loss and the like.

Second converter circuit 200 has a configuration almost identical to first converter circuit 100. That is, second converter circuit 200 includes a second controller 210, a second pulse voltage generator 220, a second inductor L2 and a second low-pass filter 230. Second converter circuit 200 has the same configuration and function as first converter circuit 100. However, second converter circuit 200 is provided symmetrically with first converter circuit 100 about secondary battery BAT. Second converter circuit 200 is different from first converter circuit 100 in that the current from second converter circuit 200 is outputted to a negative electrode terminal of secondary battery BAT. A resistor of second low-pass filter 230 may be omitted. Meanwhile, second controller 210 controls MOSFETs Q3 and Q4 to output a pulse voltage having an average voltage according to a second duty ratio in the same manner as first controller 110.

Figure 5:
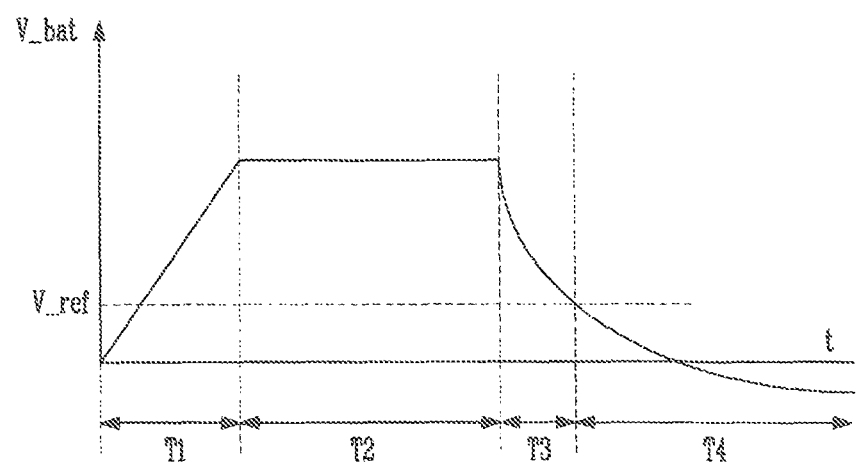
FIG. 5 is a graph showing a characteristic curve of voltages applied between both terminals of the secondary battery connected to an output stage of the charger and discharger constructed as the embodiment according to the principles of the present invention.

Hereinafter, charge and discharge modes of the charger and discharger constructed as an embodiment according to the principles of the present invention will be described with reference to FIG. 5. FIG. 5 is a graph showing a characteristic curve of voltages applied between both terminals of the secondary battery connected to an output stage of the charger and discharger constructed as this embodiment according to the principles of the present invention.

First, a charge mode will be described. The charge mode may be divided into a static current period T1 and a static voltage period T2. In the static current period T1, secondary battery BAT is charged while the duty ratio of MOSFETs Q1 and Q2 is controlled to be about 0.55 or more. That is, for 55% of one period, MOSFET Q1 is turned on while MOSFET Q2 is turned off; and then for the rest 45% of the period, MOSFET Q1 is turned off while MOSFET Q2 is turned on. In static voltage period T2, the voltage of secondary battery BAT is maintained constant while the duty ratio of MOSFETs Q1 and Q2 is controlled to be in a range of about 0.5 to 0.55 at the time when the voltage of secondary battery BAT becomes a certain value or more. In a practical charger and discharger, the voltage of secondary battery BAT is maintained constant by repeatedly performing a natural discharge through a protection circuit and then performing a charge in a return voltage.

In this instance, second controller 210 may control second pulse voltage generator 220 to be in an off-state, or may control the duty ratio of second pulse voltage generator 220 to be zero. In a case where second controller 210 controls second pulse voltage generator 220 to be in an off-state, the charger and discharger according to this embodiment can obtain an effect that second converter circuit 200 is open-circuited. That is, this case is almost similar to that of the comparative example. Meanwhile, in a case where second controller 210 controls the duty ratio of second pulse voltage generator 220 to be zero, MOSFET Q3 is in an off-state and the Q4 is in an on-state. Thus, the impedance of second inductor L2 toward second pulse voltage generator 220 has a value close to zero.

Next, a discharge mode will be described. The discharge mode may be two periods. That is, the discharge mode may be divided into a first discharge period T3 and a second discharge period T4. In first discharge period T3, secondary battery BAT is discharged mainly depending on the function of first converter circuit 100. In second discharge period T4, secondary battery BAT is discharged mainly depending on the function of second converter circuit 200.

In first discharge period T3, as described above, the discharge is performed by first converter circuit 100 in the state that second converter circuit 200 is maintained in an off-state or its duty ratio is controlled to be zero. That is, the duty ratio of first converter circuit 100 is controlled to be a value smaller than 0.5. As the discharge is performed, the voltage applied across secondary battery BAT is converged to critical voltage V_ref by the single converter circuit described above.

Figure 6:
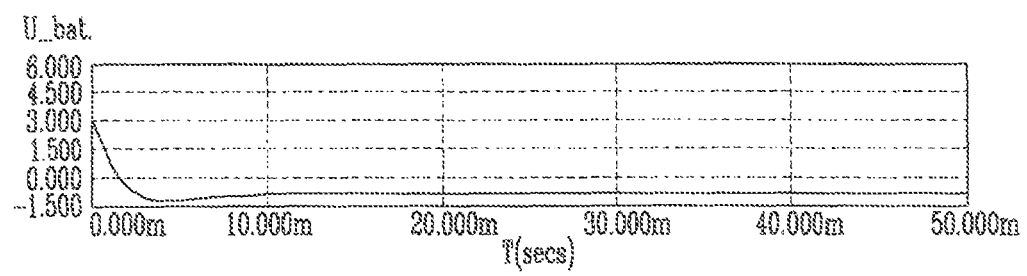
FIG. 6 is a graph obtained by practically measuring voltages applied between both the terminals of the secondary battery connected to an output stage of the charger and discharger constructed as the embodiment according to the principles of the present invention.

When the voltage of secondary battery BAT is sufficiently close to critical voltage V_ref, second discharge period T4 is performed. In second discharge period T4, the discharge is performed in the state that first converter circuit 100 is maintained in an off-state or its duty ratio is controlled to be zero. That is, the duty ratio of second converter circuit 200 is controlled to be a value smaller than 0.5. In this instance, the current outputted from second inductor L2 flows into a negative electrode terminal of secondary battery BAT. That is, high potential is formed at the negative electrode terminal of secondary battery BAT by second converter circuit 200. Consequently, the voltage applied across secondary battery BAT is decreased below the critical voltage V_ref by the single converter circuit, and may be dropped to a range of a maximum negative voltage. In such a manner, the overcharge test can be performed Data practically measured from the circuit configured as this embodiment according to the principles of the present invention will be described with reference to FIG. 6. FIG. 6 is a graph obtained by practically measuring voltages applied between both the terminals of the secondary battery connected to an output stage of the charger and discharger constructed as the embodiment of the present invention.

From the result actually measured through the circuit constructed as this embodiment, it can be seen that the discharge voltage is dropped to the maximum −1.5V.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A charger and discharger for a secondary battery, comprising:
   a secondary battery;
   a first converter circuit having a first pulse voltage generator that outputs a first pulse voltage according to a first duty ratio, and a first inductor that outputs a first electric current in proportion to a value of an integral of the outputted first pulse voltage with respect to time to a positive electrode terminal of the secondary battery;
   a second converter circuit having a second pulse voltage generator that outputs a second pulse voltage according to a second duty ratio, and a second inductor that outputs a second electric current in proportion to a value of an integral of the outputted second pulse voltage with respect to time to a negative electrode terminal of the secondary battery;
   a first controller that controls the first duty ratio of the first pulse voltage generator; and
   a second controller that controls the second duty ratio of the second pulse voltage generator.

2. The charger and discharger according to claim 1, wherein, in a charge mode, the first controller controls the first duty ratio of the first pulse voltage generator to be a value greater than 0.5, and the second controller controls the second pulse voltage generator to be in an off-state.

3. The charger and discharger according to claim 2, wherein, in a static current period of the charge mode, the first controller controls the first duty ratio of the first pulse voltage generator to be a value greater than 0.55.

4. The charger and discharger according to claim 3, wherein, in a static voltage period of the charge mode occurring subsequent to the static current period, the first controller controls the first duty ratio of the first pulse voltage generator to be a range of about 0.5 to 0.55 when a voltage applied between both terminals of the secondary battery is beyond a predetermined value.

5. The charger and discharger according to claim 1, wherein, in a charge mode, the first controller controls the first duty ratio of the first pulse voltage generator to be a value greater than 0.5, and the second controller controls the second duty ratio of the second pulse voltage generator to be zero.

6. The charger and discharger according to claim 1, wherein, in a discharge mode, the first controller controls the first duty ratio of the first pulse voltage generator to be a value smaller than 0.5, and the second controller controls the second pulse voltage generator to be in an off-state.

7. The charger and discharger according to claim 6, wherein, when a voltage applied between both of the terminals of the secondary battery reaches a minimum output voltage by the single first converter circuit, the first controller controls the first duty ratio of the first pulse voltage generator to be zero, and the second controller controls the second duty ratio of the second pulse voltage generator to exceed 0.5.

8. The charger and discharger according to claim 1, wherein, in a discharge mode, the first controller controls the first duty ratio of the first pulse voltage generator to be a value smaller than 0.5, and the second controller controls the second duty ratio of the second pulse voltage generator to be zero.

9. The charger and discharger according to claim 8, wherein, when a voltage applied between both of the terminals of the secondary battery reaches a minimum output voltage by the single first converter circuit, the first controller controls the first duty ratio of the first pulse voltage generator to be zero, and the second controller controls the second duty ratio of the second pulse voltage generator to exceed 0.5.

10. The charger and discharger according to claim 1, wherein each one of the first and second pulse voltage generators comprises a pair of metal oxide semiconductor field-effect transistors (MOSFETs) that periodically output high voltage and low voltage according to the corresponding duty ratio controlled by the corresponding first or second controller.

11. The charger and discharger according to claim 10, wherein at least one of the MOSFETs is an N-channel enhancement MOSFET.

12. The charger and discharger according to claim 1, further comprising:
   a first low-pass filter provided between the first inductor and the positive electrode terminal of the secondary battery; and
   a second low-pass filter provided between the second inductor and the negative electrode terminal of the secondary battery.

13. The charger and discharger according to claim 10, wherein the first and second low-pass filters are primary low-pass filters.

* * * * *